(12) United States Patent
Chen

(10) Patent No.: US 9,600,491 B2
(45) Date of Patent: Mar. 21, 2017

(54) METHODS FOR ACCESSING BIG DATA AND SYSTEMS USING THE SAME

(71) Applicant: Wistron Corp., New Taipei (TW)

(72) Inventor: Chih-Ming Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 97 days.

(21) Appl. No.: 14/527,694

(22) Filed: Oct. 29, 2014

(65) Prior Publication Data

US 2016/0034491 A1 Feb. 4, 2016

(30) Foreign Application Priority Data

Aug. 1, 2014 (TW) .............................. 103126348 A

(51) Int. Cl.
| | | |
|---|---|---|
| *H03M 13/00* | (2006.01) | |
| *G06F 17/30* | (2006.01) | |
| *G06F 11/10* | (2006.01) | |

(52) U.S. Cl.
CPC ........ *G06F 17/30194* (2013.01); *G06F 11/10* (2013.01); *G06F 11/1076* (2013.01); *G06F 17/30091* (2013.01)

(58) Field of Classification Search
CPC ............... G06F 17/30194; G06F 11/10; G06F 17/30864; G06F 11/1096; G06F 11/1076; G06F 9/5094; G06F 15/17331; G06F 3/067; G06F 3/0649; G06F 3/0605; H04L 1/0048; H04L 1/004; H04L 12/4641; H04L 41/5096; H04L 41/042; Y02B 60/142; G06Q 10/06
See application file for complete search history.

(56) References Cited

U.S. PATENT DOCUMENTS

| | | | | |
|---|---|---|---|---|
| 8,839,417 B1* | 9/2014 | Jordan | ................ | H04L 63/1416 709/223 |
| 9,251,194 B2* | 2/2016 | Neerincx | .......... | G06F 17/30348 |
| 2003/0219008 A1* | 11/2003 | Hrastar | ............... | H04L 63/1408 370/352 |
| 2011/0282982 A1* | 11/2011 | Jain | ........................ | G06F 9/5094 709/223 |
| 2012/0079380 A1* | 3/2012 | Tsai | ................... | G06F 17/30817 715/716 |
| 2012/0221683 A1* | 8/2012 | Ferris | .................. | H04L 12/4641 709/218 |
| 2012/0303814 A1* | 11/2012 | Ferris | ..................... | G06Q 10/06 709/226 |
| 2013/0205183 A1* | 8/2013 | Fillingim | ............ | G06F 11/1044 714/773 |

(Continued)

FOREIGN PATENT DOCUMENTS

| | | |
|---|---|---|
| TW | 200539640 A | 12/2005 |
| TW | 201428624 A | 7/2014 |

OTHER PUBLICATIONS

Taiwan Patent Office, office Action, Patent Application Serial No. 103126348, Jun. 24, 2015, Taiwan.

*Primary Examiner* — Guerrier Merant

(57) ABSTRACT

An embodiment of the invention introduces a method for accessing big data, which contains at least the following steps. A data access request is received from one of a plurality of database frontends of different kinds. A data access operation is performed for the data access request by using an API (Application Programming Interface) to manipulate one of a plurality of cloud file systems of different kinds.

23 Claims, 8 Drawing Sheets

(56) References Cited

U.S. PATENT DOCUMENTS

| | | | |
|---|---|---|---|
| 2014/0040197 A1* | 2/2014 | Wijayaratne | G06F 17/3007 707/625 |
| 2015/0121526 A1* | 4/2015 | McLarnon | G06F 21/56 726/23 |
| 2015/0149870 A1* | 5/2015 | Kozat | G06F 11/1096 714/772 |
| 2015/0254150 A1* | 9/2015 | Gordon | G06F 11/1662 714/6.3 |
| 2016/0191631 A1* | 6/2016 | Haraszti | H04L 67/14 709/227 |
| 2016/0217159 A1* | 7/2016 | Dahan | G06F 17/30566 |

* cited by examiner

METHODS FOR ACCESSING BIG DATA AND SYSTEMS USING THE SAME

CROSS REFERENCE TO RELATED APPLICATIONS

This Application claims priority of Taiwan Patent Application No. 103126348, filed on Aug. 1, 2014, the entirety of which is incorporated by reference herein.

BACKGROUND

Technical Field

The present invention relates to data access, and in particular, to methods for accessing big data and systems using the same.

Description of the Related Art

More and more enterprises establish an environment of cloud computing with big data storage. However, the big data is so large and complex that it becomes difficult to process using on-hand database management tools or traditional data processing applications. Thus, it is desirable to have methods for accessing big data and systems using the same to improve scalability.

BRIEF SUMMARY

An embodiment of the invention introduces a method for accessing big data, which contains at least the following steps. A data access request is received from one of a plurality of database frontends of different kinds. A data access operation is performed for the data access request by using an API (Application Programming Interface) to manipulate one of a plurality of cloud file systems of different kinds.

An embodiment of the invention introduces a system for accessing big data, which contains at least a SVH (Secure Verification Hashing) module. The SVH module is coupled between database frontends of different kinds and cloud file systems of different kinds. The SVH module receives a data access request from one of the database frontends; and performs a data access operation for the data access request by using an API to manipulate one of the cloud file systems.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
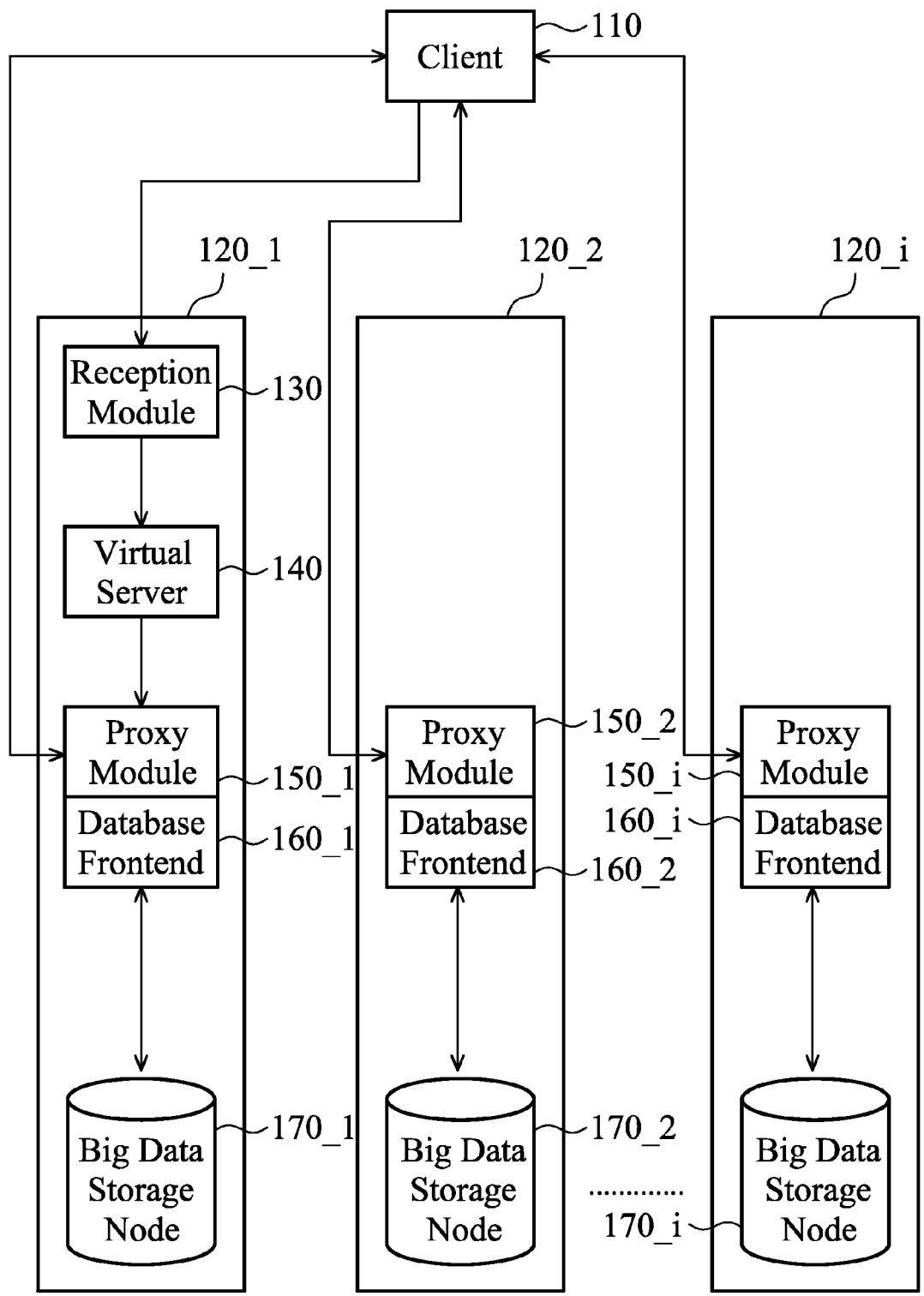
FIG. 1 is a schematic diagram of the system architecture for accessing big data according to an embodiment of the invention.

FIG. 1 is a schematic diagram of the system architecture for accessing big data according to an embodiment of the invention, containing a client 110 and big data storage sub-systems 120_1 to 120_i, where i is an integer. Although the embodiments describe the behavior of one client, those skilled in the art can realize the technology described as follows in the environment of multiple clients and the invention should not be limited thereto. The big data storage sub-system 120_1 contains one reception module 130. The reception module 130 receives a wide range of DB API (Database Application Programming Interface) requests from the client 110 and delivers said requests to a virtual server 140. The DB API may be a SQL (Structural Query Language) API, a COBOL API, etc. for implementing the layer 4 or layer 7 database command. It should be noted that only one reception module is present in the big data storage sub-systems 120_1 to 120_i as a single contact window for all clients. The reception module 130 periodically issues heartbeat signals to corresponding modules of the other big data storage sub-systems 120_2 to 120_i respectively to indicate that the reception module 130 is alive. When the reception module 130 fails to issue a heartbeat signal for a predetermined time interval, the corresponding modules of the other big data storage sub-systems 120_2 to 120_i communicate with each other to decide one of them as a new contact window for the clients. The virtual server 140 performs the load-balancing mechanism to dispatch a DB API request sent by a client to the proxy module with the lighter workload. The virtual server 140 may monitor the total number of connections between each proxy module and the clients to determine the workload of the corresponding big data storage sub-system, where a big storage sub-system having more connections with the clients is considered to have a heavier workload than one having fewer. The dispatched proxy module of 150_1, 150_2 to 150_i establishes a connection to deal with the subsequent DB API requests sent by the client 110. In other words, the reception module 130 is responsible for dealing with the first packet comprising the DB API request sent by the client 110, and then the dispatched proxy module establishes a connection with the client 110 and processes subsequent packets for the DB API request. In each big data storage sub-system, the proxy module connects to a database frontend and the database frontend connects to a big data storage node. For example, the proxy module 150_1 delivers a DB API request sent by the client 110 to the database frontend 160_1, the database frontend 160_1 interprets the DB API request and accordingly manipulates the big data storage node 170_1, so as to obtain the requested information and reply to the client 110. The information requested by the client 110 may be a statistical result or an algorithm outcome, such as correlations among products, causal analysis among events, etc.

Figure 2:
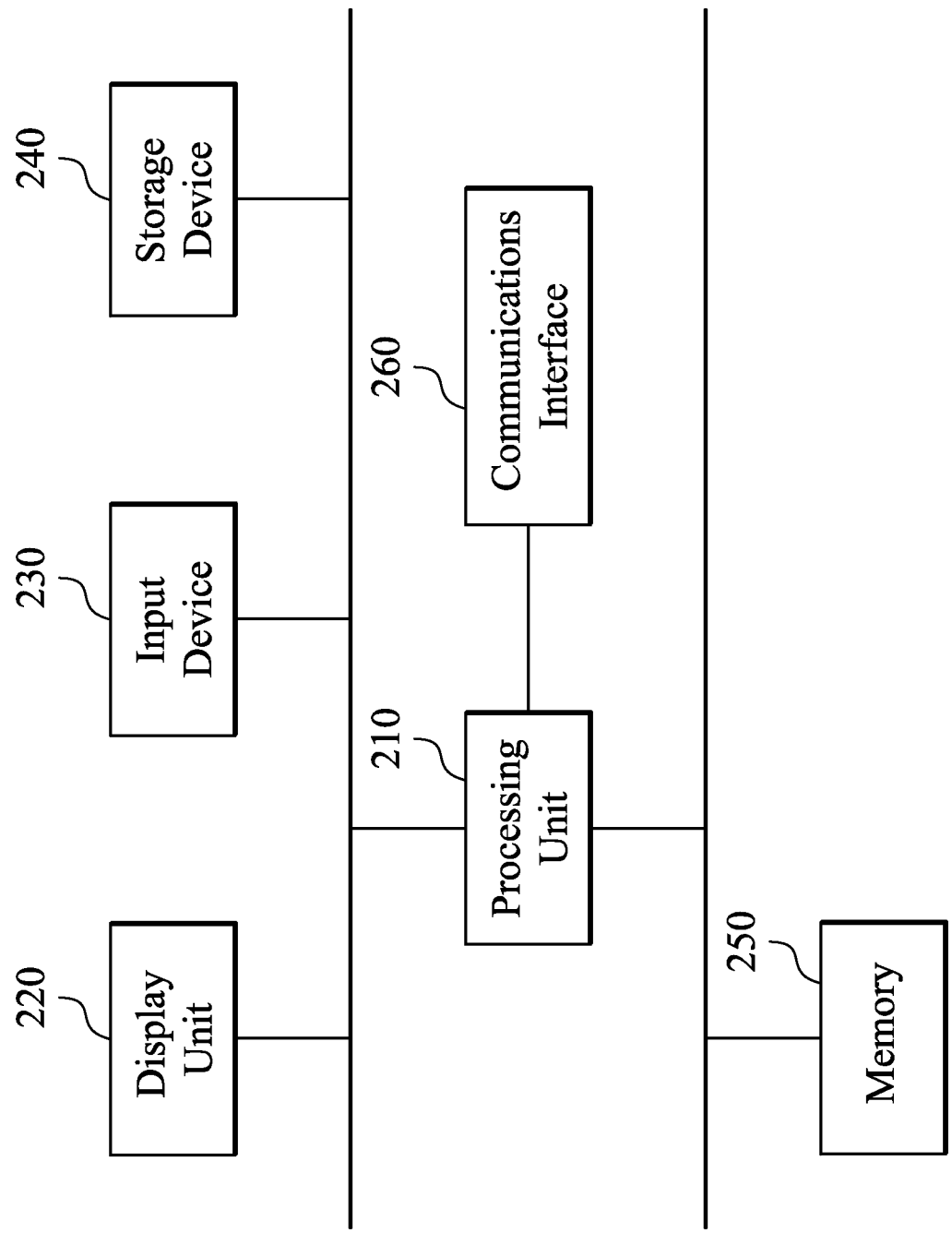
FIG. 2 is the system architecture of a computer apparatus according to an embodiment of the invention.

The reception module 130, the virtual server 140, the proxy module 150_1 and the database frontend 160_1 may be integrated in a single computer apparatus or distributed over several computer apparatuses. Similarly, a pairing of the proxy module 150_2 with the database frontend 160_2 may be integrated in a single computer apparatus or distributed over several computer apparatuses. A pairing of the proxy module 150_i with the database frontend 160_i may be integrated in a single computer apparatus or distributed over several computer apparatuses. Any of the big data storage nodes 170_1, 170_2 to 170_i may contain many computer apparatuses to complete the big data retrieval and computation. FIG. 2 is the system architecture of a computer apparatus according to an embodiment of the invention. A processing unit 210 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 250 for storing necessary data in execution, such as variables, data tables, or others, and a storage unit 240 for storing a wide range of electronic files, such as Web pages, documents, video files, audio files, or others. A communication interface 260 is included in the system architecture and the processing unit 210 can communicate with other electronic devices thereby. The communications interface 260 may be a LAN (local area network) communications module, a WLAN (wireless local area network) communications module, a Bluetooth® communications module, or others. The system architecture further includes one or more input devices 230 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a one-click, a double-click, a single-finger drag, and a multiple finger drag. A display unit 220, such as a TFT-LCD (Thin film transistor liquid-crystal display) panel, an OLED (Organic Light-Emitting Diode) panel, or others, may also be included to display input letters, alphanumeric characters and symbols, dragged paths, drawings, or screens provided by an application for the user to view.

Figure 3:
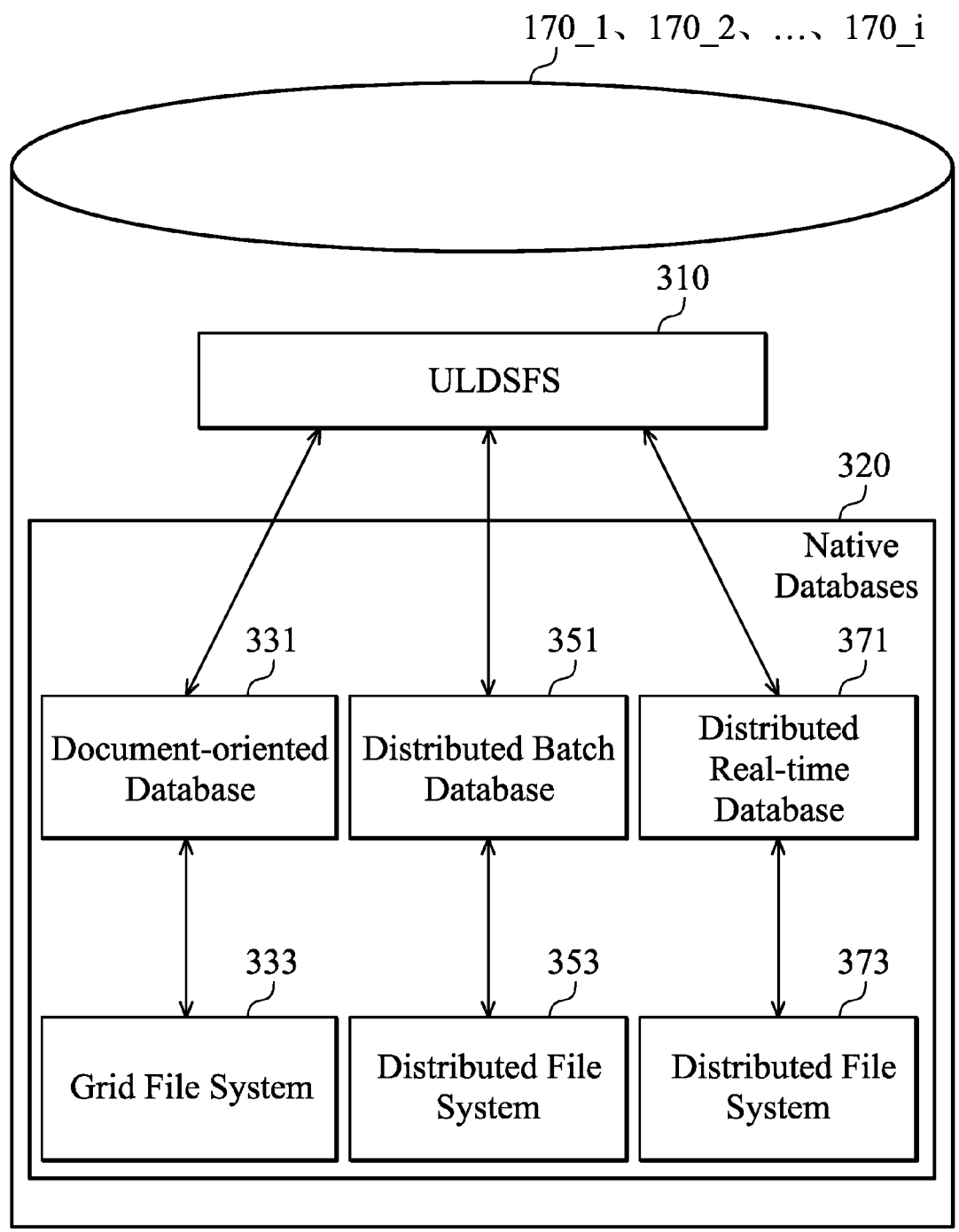
FIG. 3 is a block diagram of a big data storage node according to an embodiment of the invention.

FIG. 3 is a block diagram of a big data storage node according to an embodiment of the invention, which may be practiced in any of the big data storage nodes 170_1, 170_2 to 170_i. A ULDSFS (Unified Large Data Set File System) 310 is a middle layer, thereby enabling any of the database frontend 160_1 to 160_i of different kinds to use unified access methods to request information without considering the physical storage environment. The ULDSFS 310 may manipulate different sorts of native databases 320 capable of dealing with big data according to a request sent by any of the database frontend 160_1 to 160_i. The ULDSFS 310 is capable of manipulating APIs of different cloud file systems, that is, the ULDSFS 310 can use a relevant API to perform an access according to the type of cloud file system storing the requested data. For example, the ULDSFS 310 may use an API provided by a cross-platform document-oriented database 331 to access a grid file system 333, such as a MongoDB. The ULDSFS 310 may use an API provided by a distributed batch database 351 to access a distributed file system 353, such as an Apache® Hadoop. The ULDSFS 310 may use an API provided by a distributed real-time database 371 to access a distributed file system 373, such as an Apache® Storm.

Figure 4:
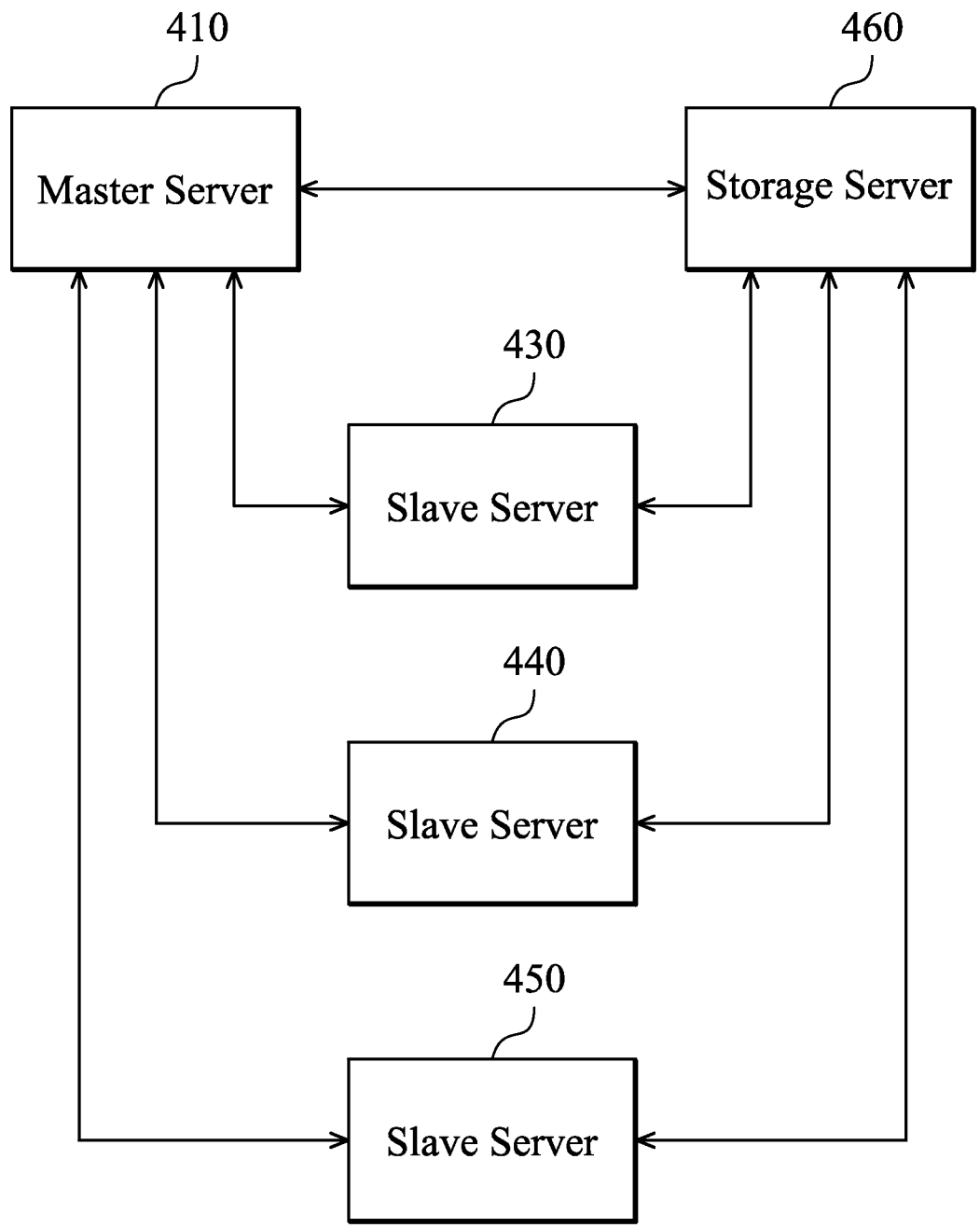
FIG. 4 is a schematic diagram of the cloud computing architecture of an Apache® Hadoop according to an embodiment of the invention.

FIG. 4 is a schematic diagram of the cloud computing architecture of an Apache® Hadoop according to an embodiment of the invention. For example, a server 410 is a master server in a cloud computing environment, mainly containing two procedures: "map" and "reduce". Servers 430 to 450 are slave servers and a server 460 is a storage server in the cloud computing environment. Those skilled in the art can realize the master server 410, the slave servers 430 to 450 and the storage server 460 can be implemented in a single computing apparatus, and the invention should not be limited thereto. In the map procedure, the master server 410 divides a task into smaller sub-tasks, and distributes them to slave servers 430 to 450 via the storage server 460. Each of the slave servers 430 to 450 processes the assigned sub-task, and stores the computation results to a designated location of the storage server 460. In the reduce procedure, the master server 410 then collects the computation results of the sub-tasks from the storage server 460 and combines them to form the output.

Figure 5:
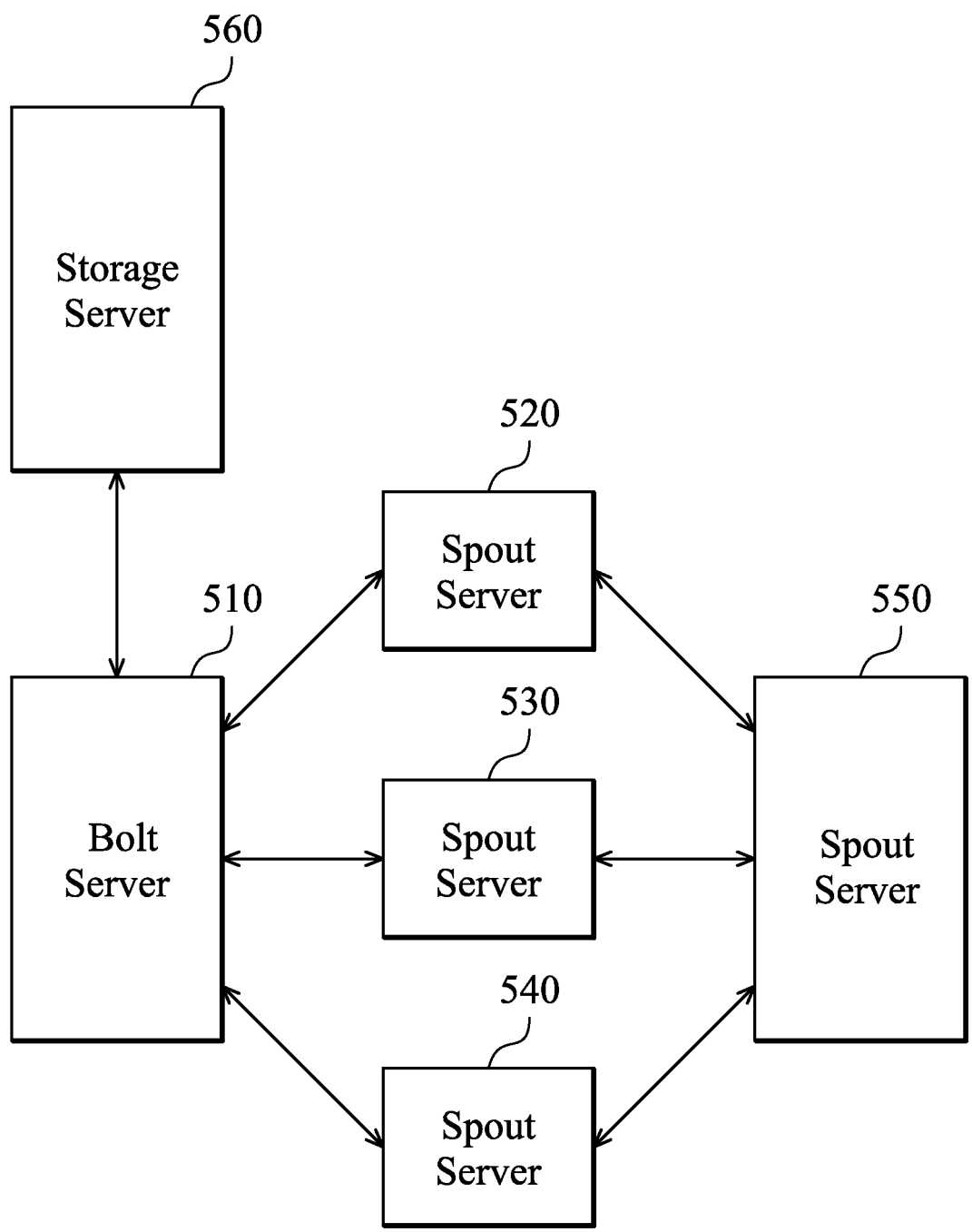
FIG. 5 is a schematic diagram of the cloud computing architecture of an Apache® Storm according to an embodiment of the invention.

FIG. 5 is a schematic diagram of the cloud computing architecture of an Apache® Storm according to an embodiment of the invention. For example, a server 510 is a bolt server in a cloud computing environment. Servers 520 to 550 are spout servers and a server 560 is a storage server in the cloud computing environment. Those skilled in the art can realize the bolt server 510, the spout servers 520 to 550 and the storage server 560 can be implemented in a single computing apparatus, and the invention should not be limited thereto. The bolt server 510 reads big data from the storage server 560 and organizes the big data as multi streams. The multi streams are dispatched to the spout servers 520 to 540. Each of the spout servers 520 to 540 computes the received data, and outputs its computation results to the spout server 550. The spout server 550 then collects all computation results and combines them to form the output.

Figure 6:
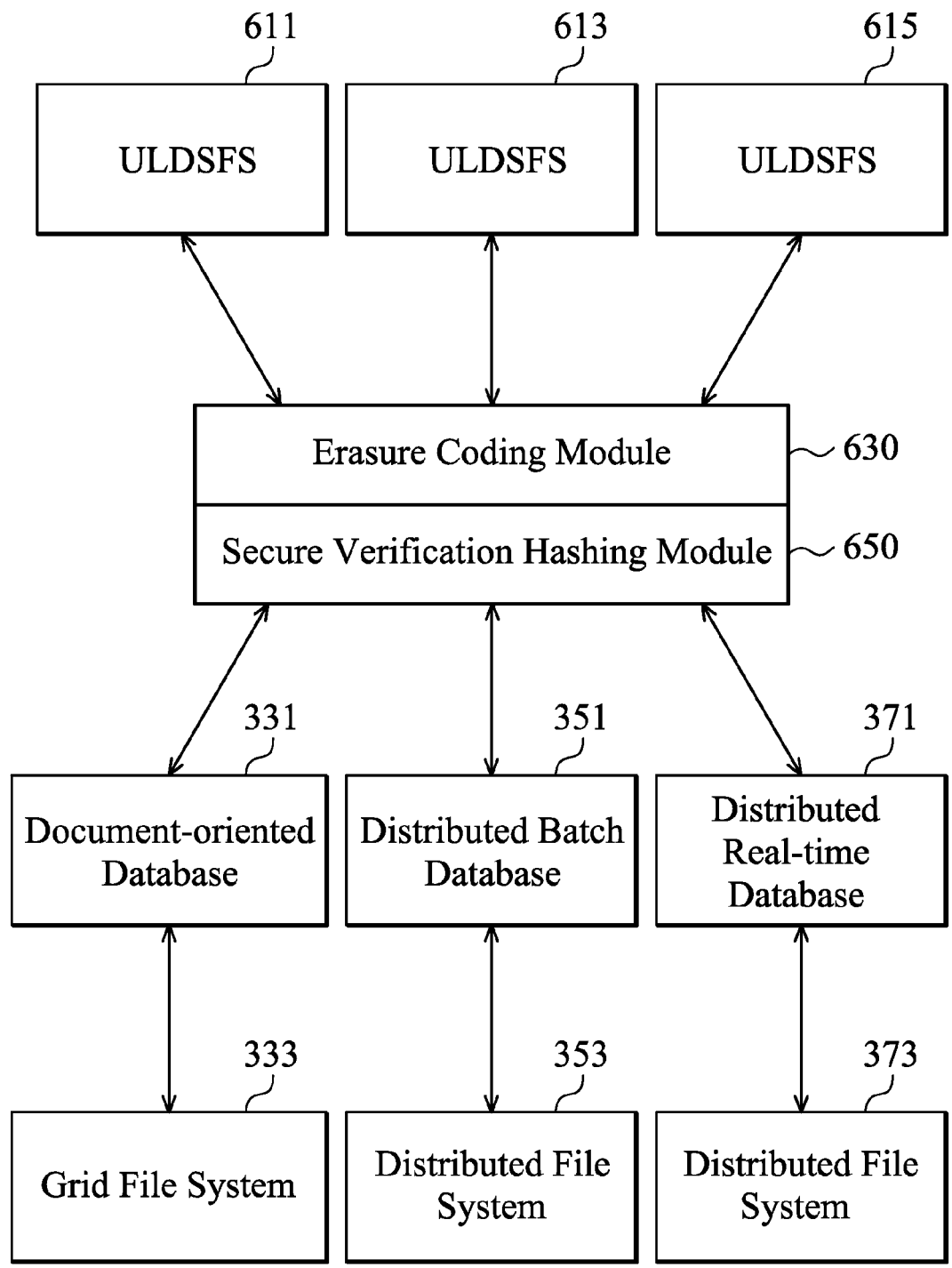
FIG. 6 is a block diagram of a big data storage node according to an embodiment of the invention.
Figure 7:
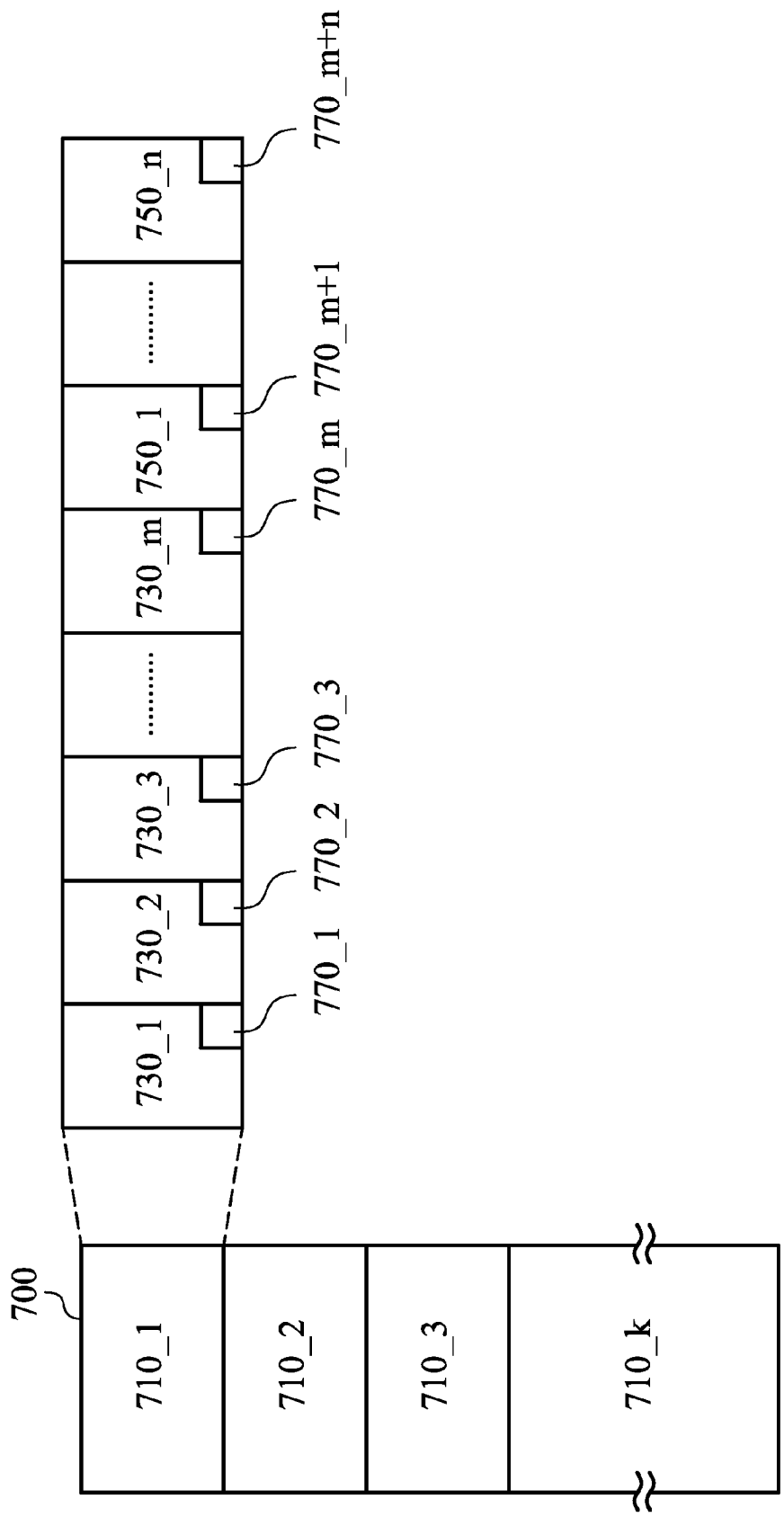
FIG. 7 is a schematic diagram of a file structure according to an embodiment of the invention.

FIG. 6 is a block diagram of a big data storage node according to an embodiment of the invention, which may be practiced in any of the big data storage nodes 170_1, 170_2 to 170_i. A erasure coding module 630 may receive a data write request from different sorts of ULDSFSs 611, 613 and 615 and generate an ECC (Error Check and Correction) code according to the data to be written. FIG. 7 is a schematic diagram of a file structure according to an embodiment of the invention. A file 700 storing big data may contain segments 710_1 to 710_k, and each segment may contain m data fragments and n parity fragments, where k, m and n are integers. For example, the segment 710_1 contains data fragments 730_1 to 730_m and parity fragments 750_1 to

750_n. The data fragments store original data received from ULDSFSs 611, 613 and 615 and the parity fragments store ECC codes generated by the erasure coding module 630. The erasure coding module 630 then transmits values of the data and parity fragments to a SVH (Secure Verification Hashing) module 650. The SVH 650 computes a hash value for each fragment using an algorithm, such as a SHA (Secure Hash Algorithm), and stores the hash value in the fragment. The hash value may improve the efficiency of the map or spout procedure of the cloud computing environment. The SVH module 650 may further store a meta tag for each of the fragments 770_1 to 770_m+n, so as to recognize a data type, such as a manufacturing process, salary, a customer, etc. The SVH module 650 writes values of the data and parity fragments to a corresponding file system, such as the grid file system 333, the distributed file system 353 or 373, according to an API provided by the document-oriented database 331, the distributed batch database 351 or the distributed real-time database 371.

The SVH module 650 reads data from a corresponding file system by using an API provided by the document-oriented database 331, the distributed batch database 351 or the distributed real-time database 371 according to a data read request sent by the ULDSFS 611, 613 or 615. The SVH module 650 verifies the integrity of data read from the document-oriented database 331, the distributed batch database 351 or the distributed real-time database 371, and attempts to correct when the read data contains error bits. When the read data has no error or the error bits of the read data have been corrected, the SVH module 650 transmits the error-free or corrected data to the erasure coding module 630, and then the erasure coding module 630 replies with the error-free or corrected data to the ULDSFS 611, 613 or 615. In addition, the SVH module 650 writes the corrected data back to the corresponding file system by using an API provided by the document-oriented database 331, the distributed batch database 351 or the distributed real-time database 371, and sends an event containing one or more meta tags of the corrected data fragments to a SIA (Security Intelligence Analytics) module. After receiving a specified number of events regarding the same meta tag, the SIA may publish fake documents as honeypots to attract and thus pinpoint malware. Or, the SIA may predict what categories of data are hotspots for hackers by machine learning and take a proper action, such as rectifying the security breaches. When the read data contains too many error bits to be corrected, the SVH module 650 notifies the erasure coding module 630 that the data has failed to be read, so that the erasure coding module 630 replies to the ULDSFS 611, 613 or 610 with the failure of the data read request. The SVH module 650 may use a well-known error correction algorithm to attempt to correct a tolerable number of error bits that occur in the data and parity fragments.

Figure 8:
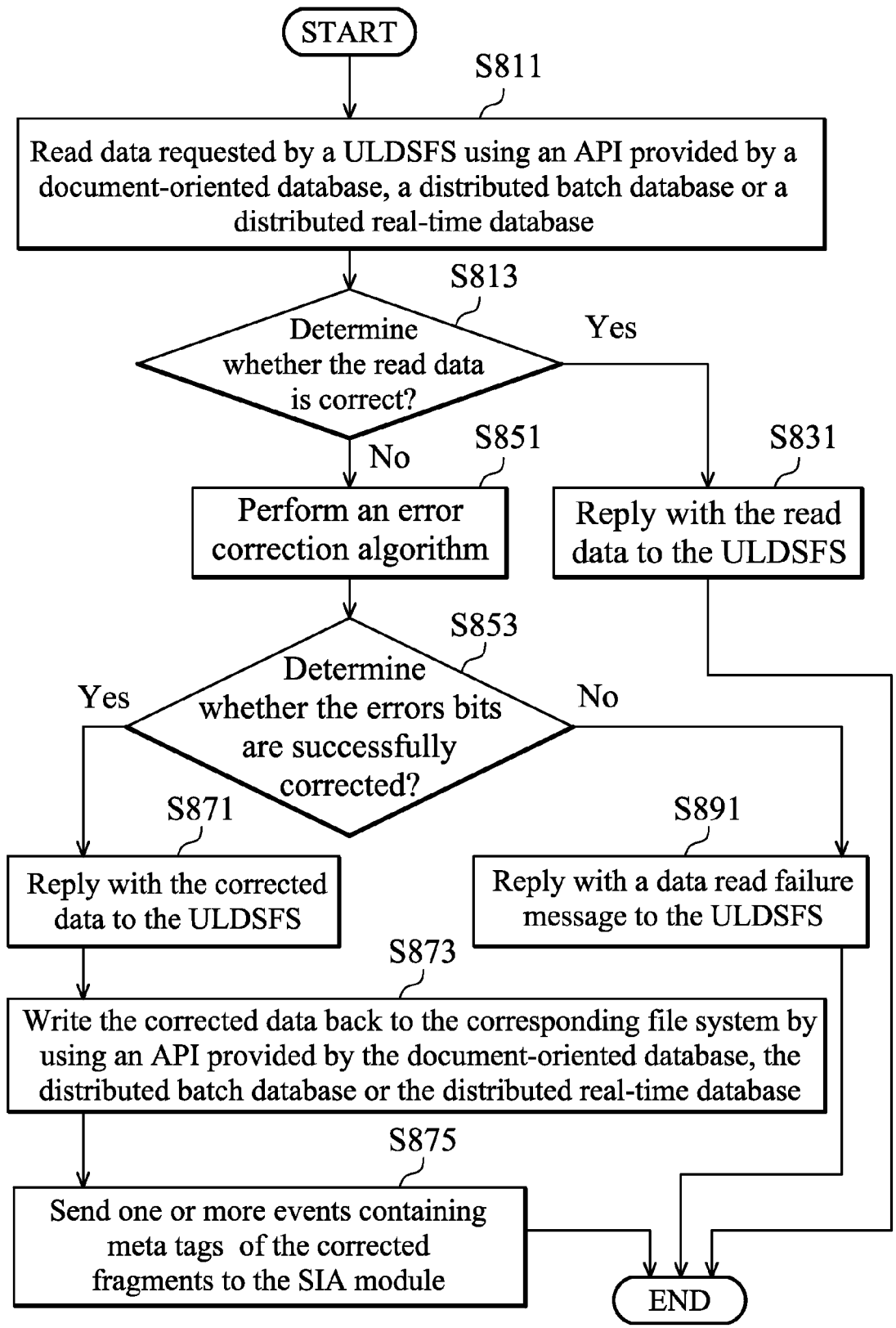
FIG. 8 is a flowchart illustrating a method for reading data, performed by a processing unit, according to an embodiment of the invention.

FIG. 8 is a flowchart illustrating a method for reading data, performed by the processing unit 210, according to an embodiment of the invention. Specifically, the method is performed when the processing unit 210 loads and executes relevant program codes of the SVH module 650. After reading data requested by a ULDSFS 611, 613 or 615 using an API provided by the document-oriented database 331, the distributed batch database 351 or the distributed real-time database 371 (step S811), the processing unit 210 determines whether the read data is correct (step S813). In step S813, the read data contains values of data and parity fragments. If so, the read data is replied to the ULDSFS 611, 613 or 615 via the erasure coding module 630 (step S831); otherwise, an error correction algorithm is performed to attempt to correct error bits (step S851). Subsequently, it is determined whether the errors bits are successfully corrected (step S853). If so, the corrected data is replied to the ULDSFS 611, 613 or 615 via the erasure coding module 630 (step S871), the corrected data is written back to the corresponding file system by using an API provided by the document-oriented database 331, the distributed batch database 351 or the distributed real-time database 371 (step S873), and one or more events containing meta tags of the corrected fragments are sent to the SIA module (step S875); otherwise, a data read failure message is replied to the ULDSFS 611, 613 or 615 via the erasure coding module 630 (step S891). In steps S813, S851 and S853, a well-known error check and correction algorithm may be used to verify whether the read or corrected data is correct and attempt to correct error bits.

Although the embodiment has been described as having specific elements in FIGS. 1 to 6, it should be noted that additional elements may be included to achieve better performance without departing from the spirit of the invention. While the process flow described in FIG. 8 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for accessing big data, comprising:
dispatching a DB (Database) API (Application Programming Interface) request from a client to one of plurality of proxy modules, wherein the proxy module receiving the DB API request connects to a database frontend, wherein the database frontend is one of a plurality of database frontends of different kinds, wherein the database frontend interprets the DB API request from the client and issues a data access request;
receiving the data access request from the database frontend; and
performing a data access operation for the data access request by using an API to manipulate one of a plurality of cloud file systems of different kinds, thereby enabling any of the database frontends of different kinds to use unified access methods to request information of the cloud file systems of different kinds.

2. The method of claim 1, wherein the API is associated with a cross-platform document-oriented database and the manipulated cloud file system is a grid file system.

3. The method of claim 1, wherein the API is associated with a distributed batch database and the manipulated cloud file system is a distributed file system.

4. The method of claim 1, wherein the API is associated with a distributed real-time database and the manipulated cloud file system is a distributed file system.

5. The method of claim 1, wherein the data access request is a data write request, the method further comprising:
generating an ECC (Error Check and Correction) code according to data to be written, wherein the data to be written is stored in a data fragment of a file and the ECC code is stored in a parity fragment of the file; and writing values of the data fragment and the parity fragment to the cloud file system by using the API.

6. The method of claim 5, further comprising:

computing a hash value for each of the data fragment and the parity fragment; and storing the hash values to the data fragment and the parity fragment.

7. The method of claim 6, further comprising:

storing a meta tag to the data fragment for recognizing a data type of the data fragment.

8. The method of claim 7, wherein the data access request is a data read request, the method further comprising:

reading data from the cloud file system using the API, wherein the data comprises values of a data fragment and a parity fragment;

determining whether the read data is correct;

replying with the read data when the read data is correct;

performing an error correction algorithm to attempt to correct error bits of the read data and determining whether the error bits have been corrected successfully when the read data is not correct;

replying with the corrected data when the error bits have been corrected successfully; and replying with a data read failure message when the error bits have not been corrected successfully.

9. The method of claim 8, further comprising:

writing the corrected data back to the cloud file system by using the API when the error bits have been corrected successfully.

10. The method of claim 9, further comprising:

sending the meta tag of the corrected data fragment to a SIA (Security Intelligence Analytics) module when the error bits have been corrected successfully, wherein the sent meta tag is used to recognize a data type of the corrected data fragment.

11. The method of claim 10, further comprising:

receiving a specified number of the same meta tag;

publishing a fake document as a honeypot by the SIA module.

12. The method of claim 10, wherein the SIA module predicts what categories of data are hotspots for hackers.

13. A system for accessing big data, comprising:

a virtual server dispatching a DB (Database) API (Application Programming Interface) request from a client to one of plurality of proxy modules, wherein the proxy module receiving the DB API request connects to a database frontend, wherein the database frontend is one of a plurality of database frontends of different kinds, wherein the database frontend interprets the DB API request from the client and issues a data access request; and a SVH (Secure Verification Hashing) module, coupled between the database frontend and a plurality of cloud file systems of different kinds, receiving the data access request from the database frontend; and performing a data access operation for the data access request by using an API to manipulate one of the cloud file systems, thereby enabling any of the database frontends of different kinds to use unified access methods to request information of the cloud file systems of different kinds.

14. The system of claim 13, wherein the API is provided by one of a cross-platform document-oriented database, a distributed batch database and a distributed real-time database, and the cloud file system comprises a grid file system and a distributed file system.

15. The system of claim 13, wherein the data access request is a data write request, the system further comprising:

an erasure coding module, generating an ECC (Error Check and Correction) code according to data to be written, wherein the data to be written is stored in a data fragment of a file and the ECC code is stored in a parity fragment of the file; and writing values of the data fragment and the parity fragment to the cloud file system by using the API.

16. The system of claim 15, wherein the SVH module computes a hash value for each of the data fragment and the parity fragment and stores the hash values to the data fragment and the parity fragment.

17. The system of claim 16, wherein the SVH module stores a meta tag for the data fragment for recognizing a data type of the data fragment.

18. The system of claim 13, wherein the data access request is a data read request and the SVH module reads data from the cloud file system using the API, where the data comprises values of a data fragment and a parity fragment; determines whether the read data is correct; replies with the read data when the read data is correct.

19. The system of claim 18, wherein the SVH module performs an error correction algorithm to attempt to correct error bits of the read data and determines whether the error bits have been corrected successfully when the read data is not correct; replies with the corrected data when the error bits have been corrected successfully; and replies with a data read failure message when the error bits have not been corrected successfully.

20. The system of claim 19, wherein the SVH module writes the corrected data back to the cloud file system using the API when the error bits have been corrected successfully.

21. The system of claim 20, wherein the SVH module sends the meta tag of the corrected data fragment to a SIA (Security Intelligence Analytics) module when the error bits have been corrected successfully, and the sent meta tag is used to recognize a data type of the corrected data fragment.

22. The system of claim 21, wherein, after receiving a specified number of the same meta tag, the SIA module publishes a fake document as a honeypot.

23. The system of claim 21, wherein the SIA module predicts what categories of data are hotspots for hackers.

* * * * *